(12) United States Patent
Geiser et al.

(10) Patent No.: US 12,241,362 B2
(45) Date of Patent: Mar. 4, 2025

(54) METHODS FOR POSITIONING A WELL FOR OPTIMAL FLUID PRODUCTION

(71) Applicant: G-O-Image, LLC, Lyons, CO (US)

(72) Inventors: Peter Geiser, Lyons, CO (US); Laird Berry Thompson, Lake Oswego, OR (US); Jan Meredith Vermilye, Lyons, CO (US)

(73) Assignee: ENEGIS, LLC, Fairfax, VA (US)

( * ) Notice: Subject to any disclaimer, the term of this patent is extended or adjusted under 35 U.S.C. 154(b) by 0 days.

(21) Appl. No.: 17/514,629

(22) Filed: Oct. 29, 2021

(65) Prior Publication Data

US 2022/0136382 A1     May 5, 2022

Related U.S. Application Data

(60) Provisional application No. 63/107,972, filed on Oct. 30, 2020.

(51) Int. Cl.
*E21B 47/002* (2012.01)
*E21B 47/12* (2012.01)
(Continued)

(52) U.S. Cl.
CPC .......... *E21B 47/0025* (2020.05); *E21B 47/12* (2013.01); *E21B 49/003* (2013.01); *G06T 11/008* (2013.01)

(58) Field of Classification Search
CPC .... E21B 47/0025; E21B 47/12; E21B 49/003; E21B 41/00; G06T 11/008
See application file for complete search history.

(56) References Cited

U.S. PATENT DOCUMENTS 6,389,361 B1   5/2002   Geiser
7,127,353 B2   10/2006   Geiser
(Continued)

FOREIGN PATENT DOCUMENTS

WO    WO 2020/242986 A1    12/2020

OTHER PUBLICATIONS

Angus et al. (2013) "Using micro-seismicity to estimate formation permeability for geological storage of CO2," Research Article, Hindawi Publishing Corporation, ISRN Geophysics, vol. 2013, Article ID 160758, 7 pp.
(Continued)

*Primary Examiner* — Catherine T. Rastovski
*Assistant Examiner* — Yossef Korang-Beheshti
(74) *Attorney, Agent, or Firm* — Leydig, Voit & Mayer, Ltd.

(57) ABSTRACT

Provided are methods of locating a well bore to optimize fluid extraction from a region of interest. In this manner, well production may be better predicted without having to go through the time and effort of drilling exploratory-type wells. The methods analyze semblance values of voxels within a full activity volume, and identify near well activity (NWA) voxels based on voxels that exceed the mean semblance value by a cut-off value. For example, the cut-off value may correspond to one or two standard deviations greater than the mean semblance value. Optimal fluid recovery corresponds to a well bore location at or near the putative location corresponding to the maximum number of NWA voxels in the region of interest.

16 Claims, 13 Drawing Sheets

(51) Int. Cl.
*E21B 49/00* (2006.01)
*G06T 11/00* (2006.01)

(56) References Cited

U.S. PATENT DOCUMENTS

| | | |
|---|---|---|
| 9,075,158 B2 | 7/2015 | Geiser |
| 9,194,967 B2 | 11/2015 | Lacazette et al. |
| 9,389,326 B2 | 7/2016 | Vermilye et al. |
| 9,442,205 B2 | 9/2016 | Geiser et al. |
| 9,557,433 B2 | 1/2017 | Geiser et al. |
| 9,810,803 B2 | 11/2017 | Vermilye et al. |
| 10,145,227 B2 | 12/2018 | Hilpert et al. |
| 11,098,565 B2 | 8/2021 | Hilpert et al. |
| 2006/0047431 A1 | 3/2006 | Geiser |
| 2008/0210470 A1 | 9/2008 | Stewart |
| 2009/0139322 A1 | 6/2009 | Montaron et al. |
| 2011/0066380 A1 | 3/2011 | Hager et al. |
| 2013/0201787 A1* | 8/2013 | Vermilye ............... G01V 1/42 367/9 |
| 2013/0282291 A1 | 10/2013 | Dasgupta |
| 2014/0019054 A1* | 1/2014 | De Prisco ............ G01N 15/08 702/12 |
| 2014/0019057 A1* | 1/2014 | Diller .................. G01V 1/34 702/16 |
| 2016/0124116 A1* | 5/2016 | Souche ............... G01V 99/005 703/2 |
| 2016/0202373 A1 | 7/2016 | Diller |
| 2016/0231444 A1 | 8/2016 | Lacazette et al. |
| 2018/0003841 A1* | 1/2018 | Souche ............... G01V 1/345 |
| 2018/0095184 A1 | 4/2018 | Hogarth et al. |
| 2018/0258763 A1 | 9/2018 | King, Jr. et al. |
| 2022/0299667 A1 | 9/2022 | Geiser |

OTHER PUBLICATIONS

Heffer (2005) "The NERC Micro to Macro Programme: Implications for fluid reservoir management," in Shaw R. P. (ed.) 2005. Understanding the Micro to Macro Behavior of Rock Fluid Systems, Geol. Soc. London, Spec. Publication 249, 5-27.

International Search Report and Written Opinion mailed Jul. 30, 2020 in International Application No. PCT/US2020/034337, 12 pp.
Leary (1997) "Rock as critical-point system and the inherent implausibility of reliable earthquake prediction," Geophys. J. Int. 131:451-466.
Leary et al. (Feb. 2020) "Flow-Imaging of Convective Geothermal Systems—Obtaining Seismic Velocity Models Needed for Production Well Targeting," Proceedings, 45th Workshop on Geothermal Reservoir Engineering, Stanford University, Stanford, California, Feb. 10-12, 2020, SGP-TR-216, 13 pp.
Leary et al. (Jul. 2020) "Seismic Imaging of Convective Geothermal Flow Systems to Increase Well Productivity," Journal of Energy and Power Technology 2(3):28; doi:10.21926/jept.2003012.
Leary et al. (Mar. 2021) "Crustal Reservoir Flow Simulation for Long-Range Spatially-Correlated Random Poroperm Media," Journal of Energy and Power Technology 3(1):19; doi: 10.21926/jept.2101013.
Malin et al. (Jan. 2020) "Observational and Critical State Physics Descriptions of Long-Range Flow Structures," Geosciences 10(2), 50; https://doi.org/10.3390/geosciences10020050.
Michelena et al. (Feb. 2019) "Seismic, geologic, geomechanics, and dynamic constraints in flow models of unconventional fractured reservoirs: Example from a south Texas field," The Leading Edge 38: 116-122.
Petrofaq.org "List of Reservoir Simulation Software," Accessed at least as early as Apr. 4, 2019. http://petrofaq.org/wiki/List_of_Reservoir_Simulation Software.
Raleigh et al. (1976) "An experiment in earthquake control at Rangely, Colorado," Science 191: 1230-1237.
Sicking et al. (Dec. 2019) "Fracture Seismic: Mapping Subsurface Connectivity," Geosciences 9(12), 508; https://doi.org/10.3390/geosciences9120508.
Tary et al. (2014) "Characteristics of fluid induced resonances observed during microseismic monitoring," Journal of Geophysical Research: Solid Earth, 119, 8207-8222.
Tary et al. (2014) "Interpretation of resonance frequencies recorded during hydraulic fracturing treatments," Journal of Geophysical Research: Solid Earth 119 (2), 1295-1315.
Vermilye et al. (1998) "The process zone: A microstructural view of fault growth," J. Geophys. Research—Solid Earth 103, 12223-12237.

* cited by examiner

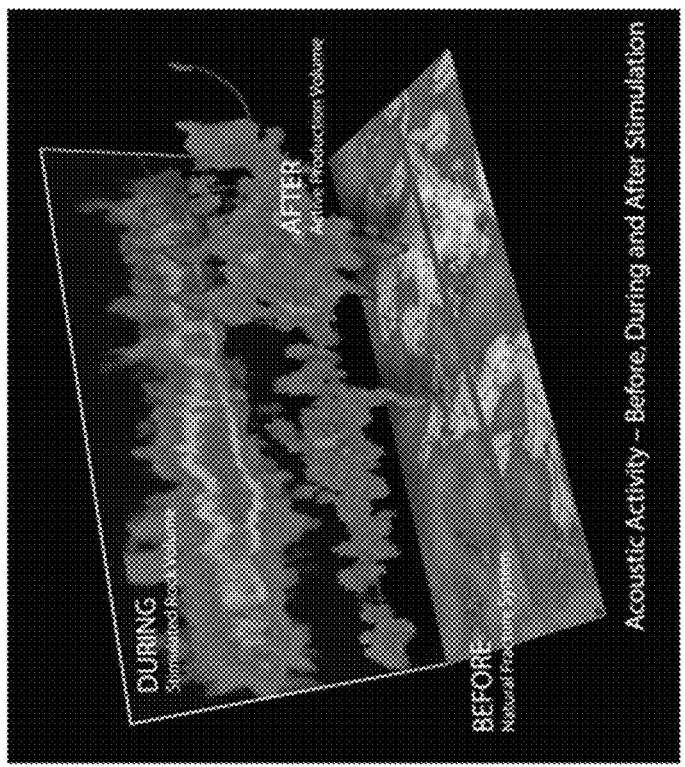
FIG. 11
Before • During • After
Before – Before well completion or even before drilling a well, map the natural fractures.
During – Image the effect of stimulation. Map interactions between wells.
After – Monitor changes in the reservoir during production.
Products are computed directly from the recorded field data.

METHODS FOR POSITIONING A WELL FOR OPTIMAL FLUID PRODUCTION

CROSS REFERENCE TO RELATED APPLICATIONS

This application claims the benefit of U.S. Provisional Patent Application No. 63/107,972 filed on Oct. 30, 2020, which is incorporated herein by reference to the extent not inconsistent herewith.

BACKGROUND OF INVENTION

It is desirable to be able to accurately forecast well production without incurring the expense of drilling. Current methods for finding the optimal location for a well to achieve maximum production involve time consuming, complex and expensive means such as 3D seismic (Brown, A. R. (1991), subsurface mapping, stratigraphic and lithologic analysis (North, F. K., 1985), geo-mechanical analysis (Zoback, 2011) and numerous other disciplines for mapping and analyzing a reservoir in order to improve the chances of drilling success. An example of the work involved is that of Michelena et al (2019). There is a need in the art for improved forecasting methods to optimize fluid recovery, including for hydrocarbon-related recovery.

Methods provided herein use Fracture Seismic Imaging™ (FSI). FSI is an improved version of Tomographic Fracture Imaging (TFI) which allows the complete spectrum of fractures and faults to be directly imaged as opposed to the more elaborate indirect methods to achieve the same end with TFI. Both methods use SET as their basic imaging tool. Sicking et al (2019). In other words FSI is a technique that uses Seismic Emission Tomography (SET) to directly map the reservoir permeability field in space and time. (Geiser et al 2006, Geiser et al, 2012, Malin and Leary, 2021). Because FSI directly maps the permeability field by analyzing the seismic response of the crust to the continual stress waves that move through it, it is both more accurate and involves little of the complexity or time-consuming analysis required by Current Methods. As described herein, the semblance value of a voxel found with FSI or TFI is proportional to the permeability. This aspect is used to provide a basis for selecting a bore location so as to maximize fluid recovery from a reservoir of interest.

SUMMARY OF THE INVENTION

The Linear Production Relation (LPR) method uses a combination of Near Well Active (NWA) voxels and virtual wells placed within a fully populated semblance volume. A fully populated semblance volume is a semblance volume where every spatial location has a voxel with an assigned semblance value; in this manner, a characteristic semblance value for all the voxels, including a mean, and a related statistical parameter reflecting the distribution of semblance across all voxels, such as a standard deviation or the like, is available. NWA voxels, therefore, are voxels whose semblance is higher than the mean semblance value by a user-defined value, including up to 2 standard deviations or more above the mean voxel semblance value, and are directly attached to the well or attached to another NWA voxel directly attached to the well. There is a linear relationship between the number of NWA voxels/foot of well and production that can be used in combination with virtual wells to locate the optimal locations for production from a reservoir.

Provided herein is a method for locating a well bore for high fluid recovery, including recover of liquids and/or gases. The method may comprise acquiring a full activity volume (FAV) for a reservoir of interest, wherein the FAV comprises a plurality of voxels. A characteristic semblance value for all the voxels in the FAV is calculated, such as a mean, median or mode. A statistical parameter indicative of the distribution of the semblance of values may also be calculated, such as a standard deviation or related parameter, such as a standard error of the mean. A threshold semblance value (TSV) is determined by identifying all voxels having a semblance value that are greater than or equal to the sum of the statistical parameter and the characteristic semblance value, referred herein as a difference value. This difference value is also referred herein as "a user-selected semblance statistical value above the mean semblance value." For example, the TSV may correspond to a difference that is equal to or greater than one standard deviation above the mean semblance value. The actual difference may be selected based in part on the number of voxels desired to satisfy the TSV. The method then identifies the near well activity (NWA) voxels corresponding to the TSV voxels identified in the determining step that are located in the geologic location of interest. In this manner, the NWA voxels correspond to a putative well bore location, thereby locating the well for high fluid recovery.

In use, modelling can be used to determine the location of the putative well bore such that a maximum number of NWA voxels occur. In this manner, fluid recovery is optimized and unnecessary drilling avoided.

Any of the methods may be for a fluid reservoir containing hydrocarbons or that is expected to contain hydrocarbons, including commercially-relevant amounts of hydrocarbons. Of course, the methods provided herein are applicable to extraction of any fluid from the brittle crust, including for hydrothermal applications (e.g., water or steam), or extraction of other material, such as helium, for example.

The method may further comprise the step of determining a maximum number of NWA voxels in direct and/or indirect contact with the putative well bore location. This is relevant as an increase in NWA voxels may correlate with increase in fluid recovery, to maximize fluid recovery by a putative well-bore location.

The maximum number of NWA voxels may further comprise voxels directly adjacent to the voxels in direct contact with the putative well location or that is connected indirectly to the putative well location via one or more intervening voxel(s).

The method may further comprise the steps of: determining the maximum number of NWA voxels for a plurality of putative well bore locations; and identifying an optimal well bore location corresponding to the putative well bore location having a highest maximum number of NWA voxels.

The fluid may be a liquid and the liquid recovery of the well bore positioned at the putative well bore location is proportional to a total number of NWA voxels. The liquid may be a hydrocarbon-containing liquid or water.

The step of acquiring the FAV may comprise, for a reservoir of interest, using one or more of: a 3D seismic survey; a geophone surface array; a geophone buried array; or any combination thereof.

The user-selected semblance statistical value may be one standard deviation or greater, including two standard deviations or greater than the characteristic semblance value over all the voxels. The characteristic semblance value may be a mean semblance value over the population of voxels The determining the TSV step may be by identifying all voxels having the semblance value that are greater than two standard deviations of the mean semblance value.

The method may be for a fluid recovery of hydrocarbon or water.

Each voxel may have a volume of between 5 m$^3$ and 12 m$^3$. The reservoir of interest may have a volume of between 1 km$^3$ and 1000 km$^3$.

The method may further comprise the step of populating a 3D volume representation of the reservoir of interest with the NWA voxels and not populating the 3D volume with voxels having a semblance value less than the semblance value of the NWA voxels, thereby visualizing the NWA voxels. In this manner, the putative position of a well bore may be visualized as corresponding to those voxels having the required deviation from the typical semblance value (such as a mean semblance value).

The method may further comprise the step of drilling a well bore in the reservoir of interest at a location corresponding to the putative well bore location having the highest maximum number of NWA voxels.

The semblance value may be a time-varying semblance value.

The semblance value may be determined for multiple time periods.

The step of acquiring the FAV may comprise: imaging the reservoir of interest for a period of time, the period of time ranging up to 24 hours and at a sampling rate of between 100 Hz and 2 kHz.

The FAV may be obtained for a time range that is between 0.5 s and 100 days.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 11: Composite image showing relationship between semblance and fluid locations before, during and after fracing (courtesy ARM).

DETAILED DESCRIPTION OF THE INVENTION

Figure 1:
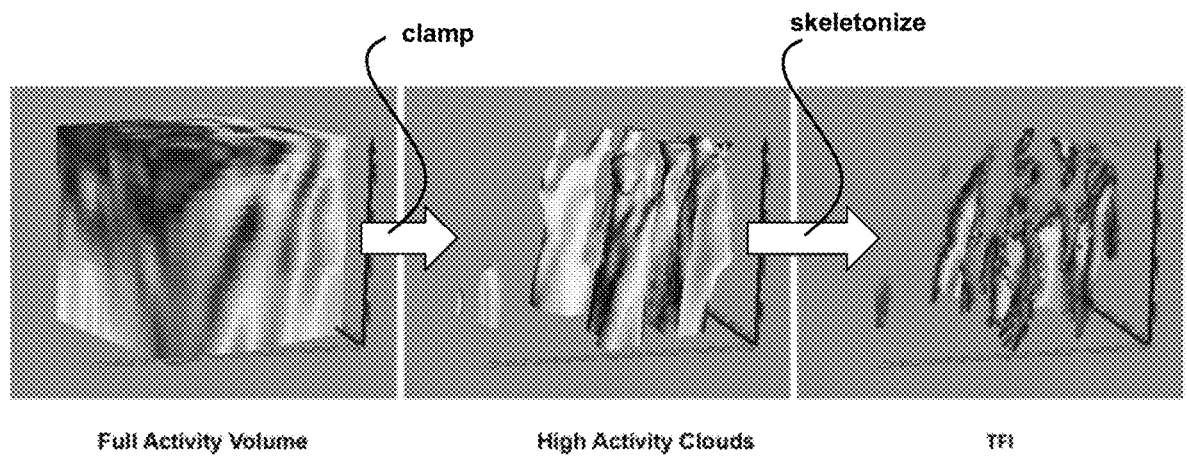
FIG. 1: TFI Work flow: Full Activity Volume (FAV); High Activity Clouds (HAC).

In the following description, numerous specific details of the devices, device components and methods of the present invention are set forth in order to provide a thorough explanation of the precise nature of the invention. It will be apparent, however, to those of skill in the art that the invention can be practiced without these specific details.

In general, the terms and phrases used herein have their art-recognized meaning, which can be found by reference to standard texts, journal references and contexts known to those skilled in the art. The following definitions are provided to clarify their specific use in the context of the invention.

"High fluid recovery" refers to the method provided herein that optimizes fluid recovery by positioning a well to maximize the number of NWA voxels. The fluid may be a liquid, a gas, or a combination of a liquid and gas.

"Semblance" is a general term for a measure of similarity. As used herein, semblance expresses the "goodness" of fit of seismic trace data. The greater the amount of energy emitted by a source, the greater the similarity of the traces and the higher the semblance. Generally, the relevant reservoir, specifically the FAV, comprises a plurality of voxels. Each voxel as a semblance. The semblance value of a voxel's emissions as observed over a short time interval and between different receivers provides a measure of how well the observed signals match at each receiver by correlating them over a time interval common to the entire FAV (e.g., 1 s, 10 s, etc.). The values are then accumulated over many intervals, with the results that voxels with high rates of emission stand out over ones with little or no activity. The FAV accordingly corresponds to a complete set of such voxels with their semblance value.

A "characteristic semblance value" is used herein to refer to a typical semblance value. Accordingly, the characteristic semblance value can be a mean, median or other measure, such as a mode (particularly for semblance values having a normal distribution). Preferably, the characteristic semblance value is a mean.

A "user-selected semblance statistical value" refers to a statistical parameter associated with the semblance values of the voxels of the FAV. Preferably, the semblance statistical value is a measure of the variation or distribution of the population of semblance values, such as a standard deviation or a standard error of the mean. In an embodiment, the user-selected semblance statistical value is equivalent to one-standard deviation or greater. Depending on the application of interest, the semblance statistical value can be of lower or higher value. For example, for high resolution data (e.g., voxels having smaller volumes), the semblance statistical value may be relatively high, such as greater than or equal to two standard deviations, in effect decreasing the tolerance of the TSV and, in effect, decreasing the total number of NWA voxels (see, e.g., TABLE 1). In general, identifying voxels that are greater than the mean voxel value by higher magnitude semblance statistical values can provide more precise bore location for optimized or high fluid production compared to a bore well located away from these voxels. The methods provided herein, of course, are compatible with a range of statistical parameters, so long as the statistical parameter is a measure of the distribution of the voxel values. For example, the statistical parameter may be a standard deviation or a standard error of the mean, or greater, above the characteristic semblance value.

"Seismic Emission Tomography" or "SET" refers to the collection and analysis of seismic waves from sources within the study volume (e.g. geologic formation, reservoir) to provide information about a below surface geologic formation or fluid reservoir. SET monitors changes in seismic energy emission due to changes in embedded fluid pressure to generate data relating to mechanical properties of the formation, including permeability. Further description can be found in U.S. Pat. No. 7,127,353 and WO 2020/242986. Briefly, a SET array is established so as to acquire seismic energy data from a change in fluid pressure in a reservoir.

"Voxel" refers to a point or three-dimensional volume that describes or corresponds to a specific position within three-dimensional space. Voxel may refer to data collected by SET corresponding to a specific point or volume of a fluid reservoir. For example, a voxel may refer to semblance data or signals indicating permeability of the natural features of the fluid reservoir. Voxel may also refer to permeability data post-processing. A voxel may have both time and energy components wherein other data included in the voxel corresponds specifically to the time in which the data was acquired and the seismic energy emitted at that time. Voxels may be processed or analyzed by the various methods described herein, including for semblance.

"Fluid Reservoir" refers to a geologic formation containing one or more fluids embedded or trapped within the formation. Fluid reservoirs may have naturally occurring permeability and porosity. Fluid reservoirs may contain hydrocarbons or molecules comprising primarily hydrogen and carbon, but may contain other elements, for example, oxygen, nitrogen, and sulfur. Hydrocarbons may refer to fluids targeted for recovery and production common in the oil and gas industry, including oil, natural gas, condensate and the like, but also include more complex molecules, such as naturally occurring polymers and paraffins. Other fluids include, but are not limited to hydrothermal fluids, water, helium and the like.

Fracture Seismic Imaging (FSI) Nomenclature: The following terms to describe the set of images produced by FSI and TFI. FIG. 1 shows the original method for finding the surfaces of maximum fluid content, referred to as Reservoir Scale TFI; RS TFI (Geiser et al 2012). Following the work of Malin et al, (2020) those features are now referred to as AFI. AFI and RS TFI are functionally identical and only differentiated on the basis of the method for locating them; RS TFI are located using Tomographic Fracture Imaging (Geiser et al, 2006; 2012: AFI are the product of Fracture Seismic Imaging.

The TFI method (FIG. 1) is limited by the two requirements:

(i) The necessity of using a somewhat arbitrary semblance "cut off" value for extracting the "High Activity Clouds" (HAC) this limits the TFI to only those surfaces which have semblance values in the "cut off" value range. To find TFI not in the range of the "cut off" value used, requires finding and using successive "cut off" values and skeletonizations; and (ii) The use of skeletonization to find the medial surface of the HAC rather than the actual surface of maximum semblance value.

Figure 2:
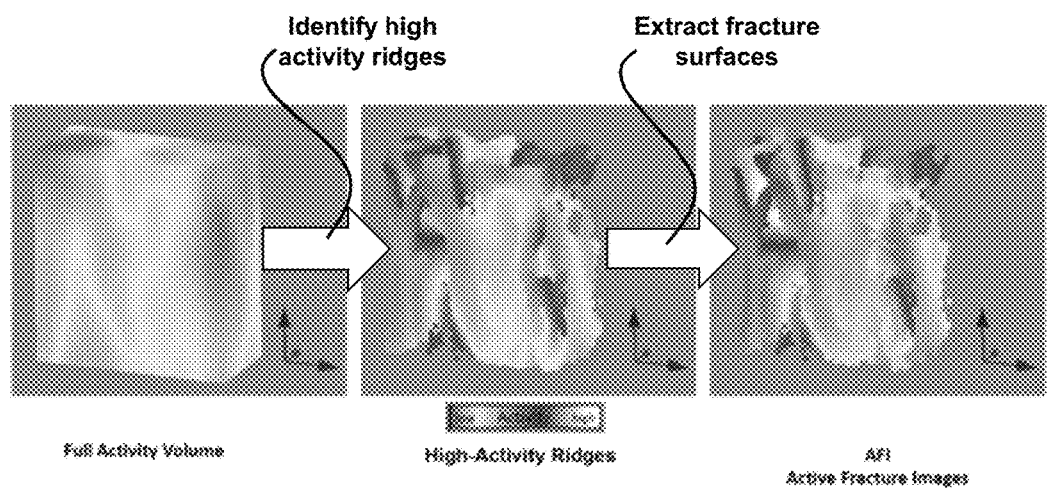
FIG. 2: FSI workflow.

FIG. 2 outlines a method to find the Active Fracture Images (AFI) using the "Peak Picker". The "Peak Picker" searches the Full Activity Volume for all the voxels with the highest semblance values that can be connected to form High Activity Ridges. The ridges are skeletonized to produce Active Fracture Images (AFI) that are one voxel thick. These are the "flow AFI" of Malin et al (2020). Because the AFI found by the Peak Picker are not based on a threshold value, FSI finds the complete suite of AFI in a single search as opposed to the multiple searches to arrive at the same result required by TFI.

FSI/TFI Nomenclature:

The Full Activity Volume (FAV) is the complete set of voxels showing the activity for the time period selected. The methods provided herein are compatible with any of a range of time periods, e.g. 1 hour, 1 second, etc. The resolution of FSI is set by the voxel size which typically range from 8 $m^3$ to 10 $m^3$.

The High Activity Clouds (HAC) are the volumes extracted from the FAV that consist of all voxels whose semblance value is above a selected cutoff value. Note that the regions of maximum semblance value (reddish orange) are incased in volumes delineated by surfaces of the same color which means that the enveloping surfaces are iso-surfaces i.e. surfaces with the same semblance value.

The Tomographic Fracture Images (TFI) are the set of voxels that form the medial surface of a HAC. TFI are a single voxel thick.

Active Fracture Images (AFI): The AFI are the product of the following work flow: Compute the semblance Full Activity Volume (FAV); Peak Picker (PP) tool picks all voxels which are local maxima and links together all local maxima next to another local maxima producing High Activity Ridges; The High Activity Ridges are skeletonized to produce a surface that is a single voxel thick, the AFI The Geocritical Reservoir The first principal analytic solutions of Malin et al, (2020) for the evolution of the critical crust permeability field, permits a deeper understanding of the brittle crust permeability field. This work yields a new comprehensive model for fluid reservoir permeability fields.

Two analytic keys for deducing this model are: (i) Identifying the pathways that allow fluids to both enter, move through and exit the heterogeneous GeoCritical permeability field; and (ii) The evidence that a major part of the energy expressed as semblance values is a function of resonance of fluid filled cracks activated by stress waves continually moving through the Earth (Sicking and Malin, 2019).

Although the focus is on sedimentary basins, the model is generally applicable to all low temperature non-metamorphic environments including orogenic belts.

Consistent with a scale-independent critical state system, the permeability field architecture that forms the GeoCritical Reservoir model comprises a micro to macro scale mechanism for the movement of fluids through the brittle crust permeability field. Detail study of the architecture are both scale-independent, i.e. the same basic geometry of the permeability field extends across several orders of magnitude, and stress state independent, i.e. the architecture is fundamentally the same in both extensional and compressional environments.

Permeability Field Fabric Elements

This section describes the basic fabric elements of the permeability field architecture and the evidence that the semblance value is proportional to the permeability. First, the term "fabric" is used in the sense of Bruno Sander as described by Paterson and Weise (1961) as "the internal configuration of the body . . . a fabric can be considered infinite in extent."

Figure 3:
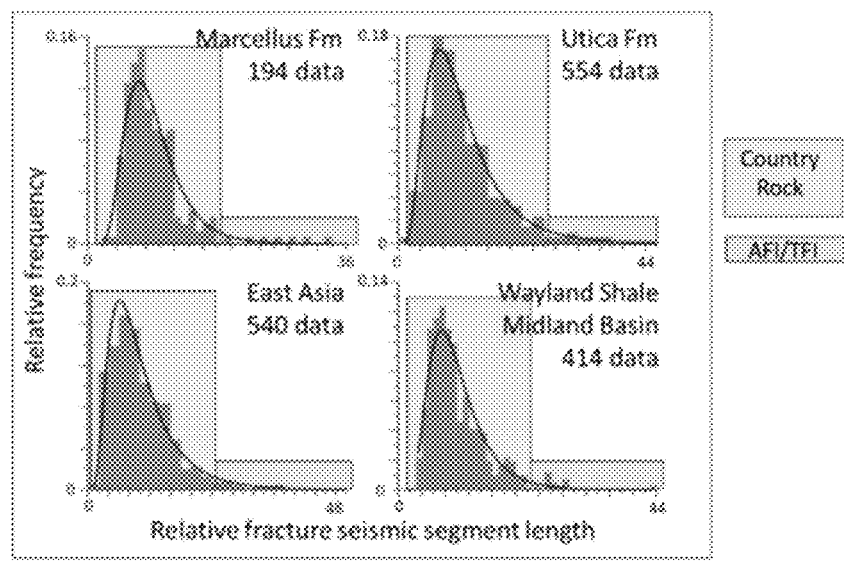
FIG. 3: Plots showing frequency of normalized fracture segment lengths from different sedimentary basins.

While faults can be important fluid conduits, the majority of reservoirs consist of rocks lacking significant faulting but are permeated by joint controlled fractures whose frequency/size distribution follow a log-normal power law (Laubach et al, 2000; Malin et al, 2020). FIG. 3 is a set of frequency/size plots from a number of different sedimentary basins. They show a natural subdivision of the fractures in terms of frequency and size which we designate as "Country rock" and "AFI/TFI" fabric elements. Accordingly, we have two fabric elements: "Country Rock"; that part of the reservoir whose relative fracture segment size/frequency is >0.07; and AFI/TFI which are the "Channels" of (Malin et al 2020, "backbone"); that part of the reservoir consisting of fractures having relative segment size frequency ≤0.07.

Such heterogeneity and localization of relatively high-volume fluid pathways is predicted by the Leary/Malin geocritical theory (Malin et al. 2020, FIGS. 7 and 9) who refer to it as "channelized flow". FSI and TFI reveal that the AFI/TFI "Channels" are discrete sub-planar volumes manifest as undulose surfaces whose widths in sedimentary basins are at the m scale and whose length and height is at the macro (100 m-1000 m) scale.

Country Rock: Country Rock permeability fabric elements are posited to consist largely of fractures and small faults that are below the 8-meter maximum resolution of FSI/TFI. They form the bulk of the fractures of the power law/size frequency distribution characteristic of the Earth's brittle crust, e.g., Marrett et al, 1999; Laubach et al, 2000; Malin et al, 2020.

AFI and RS TFI: These are permeability fabric elements embedded in the "Country Rock". They are surfaces a single voxel in thickness that located by the medial surface of High Activity Clouds (HAC, FIG. 1) or by the surface of maximum semblance values embedded within the High Activity Ridges called Active Fracture Images (AFI) of FIG. 2. AFI and TFI are surrounded by closed ellipsoidal iso-surface volumes large enough to be imaged by FSI and lie on the "tail" of the power law size/frequency distribution. Evidence indicates that AFI and RS TFI are primarily zones of maximum fracture density. Because AFI and TFI are functionally identical and all processing is now currently done with FSI, the term "AFI" is used throughout the rest of this discussion.

Permeability Field Energetic Phenomena

The following types of phenomena are currently recognized as making up the total energetic components of the GeoCritical Reservoir permeability field:

Fluid Pressure (Pf) waves created by rapid fluctuations in Pf produced by both production and fracing. The Pf wave has soliton like properties and propagates at rates on the order of 10 s of meters/sec. This wave appears to be restricted to the AFI i.e., the regions of highest fluid content. (Geiser et al, 2006)

Krauklis waves generated by resonance of the walls of fluid filled fractures. We hypothesize that the energy creating the resonance is provided by any or all of the following: Pf waves; fluid flow. (Tarry et al, 2014 a, b, Sicking and Leary 2020); Fluctuation of the ambient semblance field.

Facture propagation: Seismic energy resulting from the propagation of pre-existing fracture tips.

Induced Seismic waves generated by fracing and production.

Ambient stress waves generated by natural phenomena, e.g. Earth tides, air mass movement, teleseismic, marine waves, etc. (Geiser et al, 2006).

The Relation Between Seismic Emissions and Fracture Density

This section shows that high fracture density is associated with high energy emission and that the HAC are fracture zones rather than damage zones associated with faults.

Figure 4:
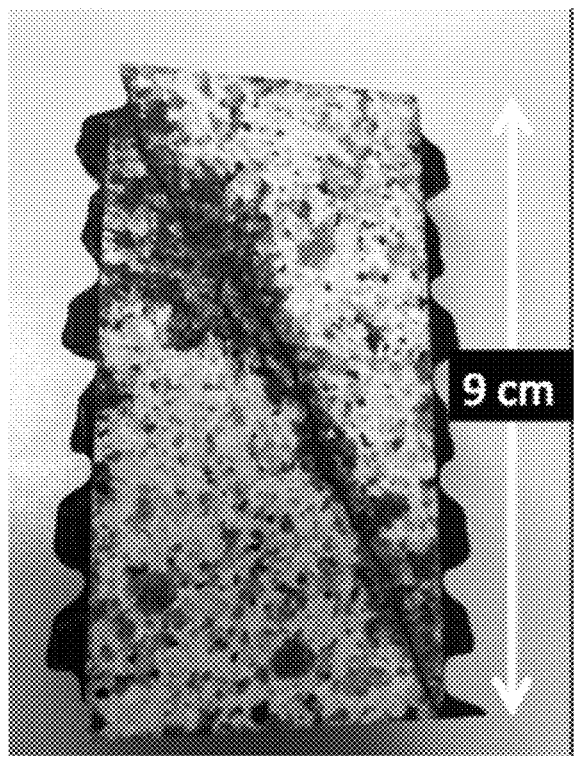
FIG. 4: Damage zone in experimentally deformed granite sample. The damage zone is made visible by the penetration of blue epoxy resin into the micro-cracks that form the zone. The larger area of micro-cracking is a fault step-over or transfer zone from one fault to the next. (Courtesy of Prof. Georg Dresen; GFZ.)
Figure 5:
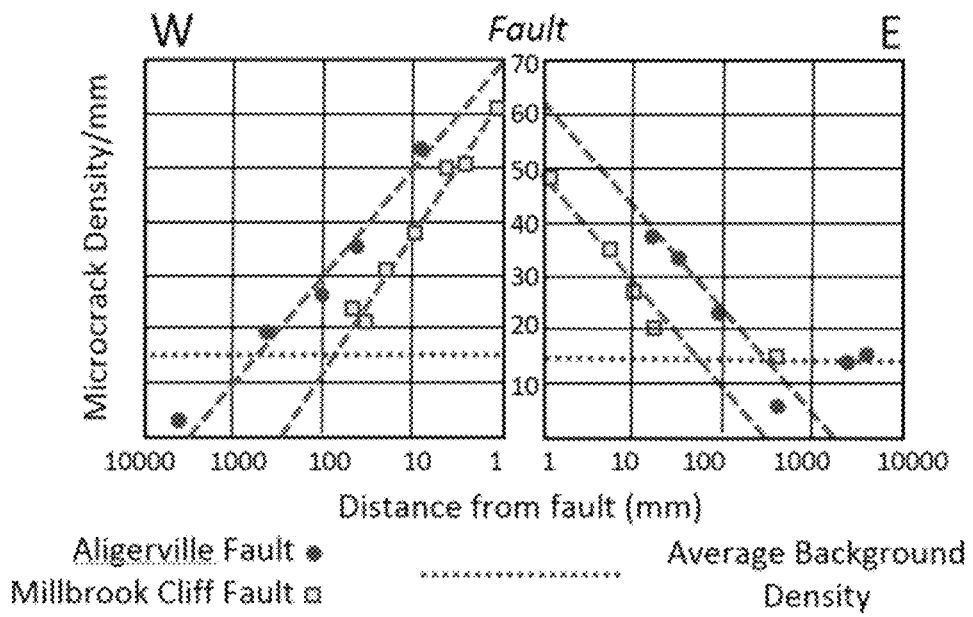
FIG. 5: Plot of micro-crack density v. distance from fault. Vermilye and Scholz, 1998.
Figure 7:
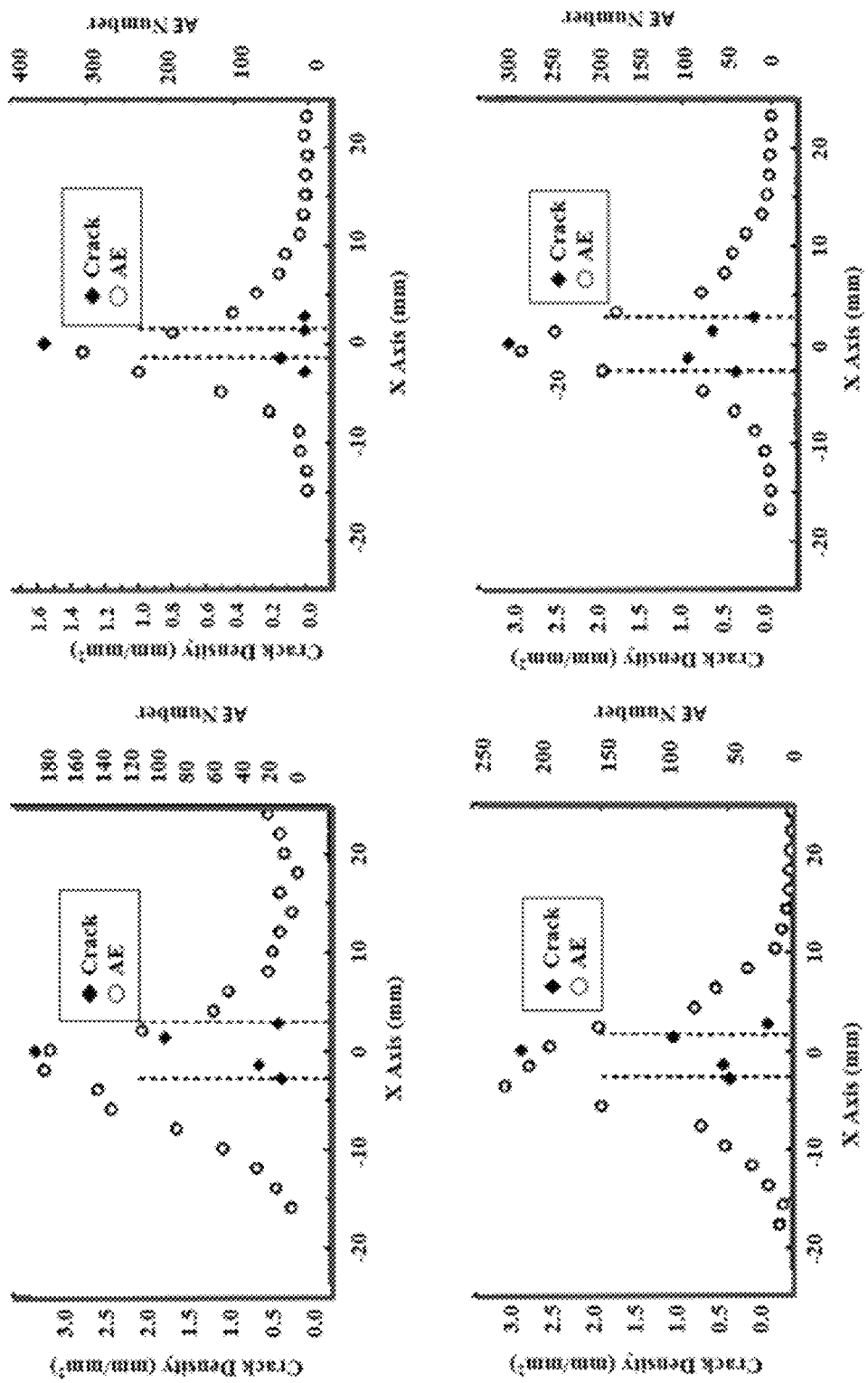
FIG. 7: Experimental data showing increase in acoustic energy as a function of crack density (Janssen et al, 2001).

Damage zones: Damage zones are sites of high fracture density surrounding faults. They are the product of crack/fault propagation (e.g. Scholz; 2002) that surround the fault or fracture and tend to be symmetrically distributed about the discontinuity. Damage zones are present from the millimeter (FIG. 4) and meter scales (FIG. 5) to the kilometer (FIG. 7).

Figure 6:
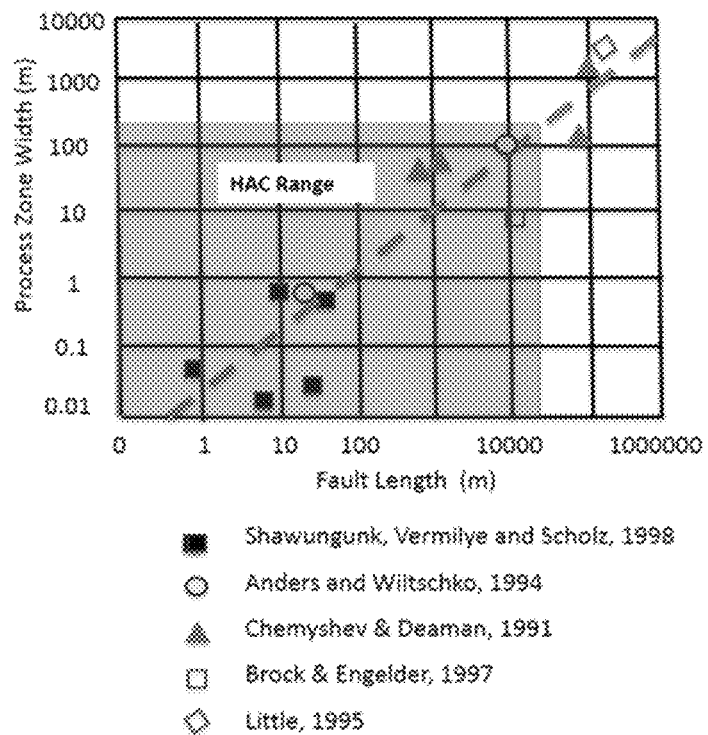
FIG. 6: Increase of damage zone thickness with length of fault. (Scholz, 2002) indicating that if the HAC are fault zones then most would be associated with faults whose length is greater than 10 m.

The width of the zone increases with length of the fracture/fault zone and plots linearly on a log-log plot (FIG. 6; Scholz, 2002), while the crack density of damage zones increases geometrically and symmetrically towards the center of the zone, FIG. 7, (Jannsen et al, 2001).

Because seismic energy emission is proportional to crack density and crack density increases geometrically and symmetrically towards the zone centrum so does the seismic energy. Accordingly the plots of fracture density shown by both Jannsen et al (FIG. 7), as well as Vermilye and Scholz (FIG. 5), demonstrate that the highest semblance values should occur at the approximate center of the semblance cloud. This surface of highest semblance is the Channel.

While some of the seismic energy sources of the HAC are due to the propagation of pre-existing fractures and new ones as well, an as yet unknown but apparently significant part of the source is attributed to fluid resonance in pre-existing fractures (Tary et al., 2014 a, b; Sicking et al, 2019) as well as whole rock resonance.

Geologic Analysis of AFI

Figure 8:
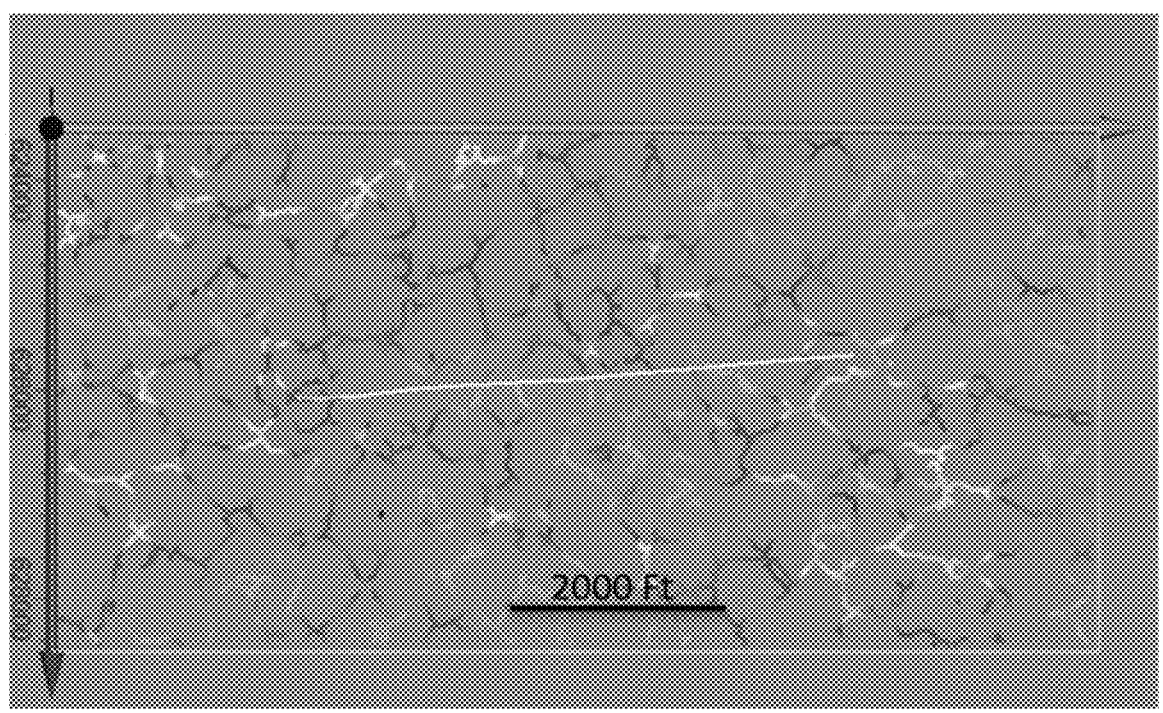
FIG. 8: Typical FSI Map of AFI, color coded for semblance. Red is maximum, blue is minimum. White line is lateral well.

Evidence that the HAC are fracture zones is found by considering them in the context of three data sets relevant to faulting namely: Fault length v. Process zone Width; Displacement (D) v Fault length (L) ratio: D/L≈0.03 (Scholz, 2002); Channel map patterns (FIG. 8).

One of the most significant differences between fault damage zones and the regions of high semblance value that form the HAC is that as shown in FIG. 7. HAC widths are typically on the order of 50 to 100 meters which would require that they be associated with faults ≥100 meters. Considering that most HAC and associated AFI have lengths that are typically on the order of kilometers (e.g. FIG. 8), then using the displacement/Length (D/L) ratios of Scholz (2002), (D/L) ratio=0.03, or Elliott (1977), D/L≈0.07, this would require that most of the HAC would be associated with fault displacements >>30 meters. No such displacements have been found.

While no systematic study of the metrics of HACs has been done, simple inspection shows the following: (i) AFI are irregular in map view e.g. FIG. 8, with segment lengths on the 100 m scale; and (ii) The lattice like irregularity of the Channel segments (FIG. 8) are inconsistent with the more linear pattern of faults but are perhaps consistent with Nonsystematic Fault arrays arising from faults controlled by pre-existing fractures, e.g. Van der Pluijm and Marshak (2004, FIG. 8.31 and table 8.7.). However as discussed D/L ratios of Scholz (2002) and Elliott (1977) argue against this.

Analyzing the damage zones in terms of Width/Length and D/L metrics indicates that the reservoir scale AFI are inconsistent with interpretation as fault related phenomenon and instead are interpreted as primarily fracture zones.

SFI and Semblance Stratigraphy

Further understanding of the geologic nature of the HAC and the semblance value can be had from its response to rock mechanical properties. Two properties of stronger rocks are expected to cause them to emit more energy than relatively weaker rocks and therefore semblance values should vary accordingly, i.e. stronger rock exhibiting higher semblance value than weaker rocks. These properties are: (i) The "stronger" the rock, the more energy is emitted during failure; and (ii) Stronger rocks can support greater crack density than "weaker" rocks e.g. shales, and therefore have a higher fluid content.

The result is that the contrast between the semblance of stronger rock and weaker rock causes a systematic variation in semblance value which is referred to as "Semblance Stratigraphy". A vertical slice through a Marcellus Full Activity Volume (FIG. 9), clearly demonstrates this property.

Figure 9:
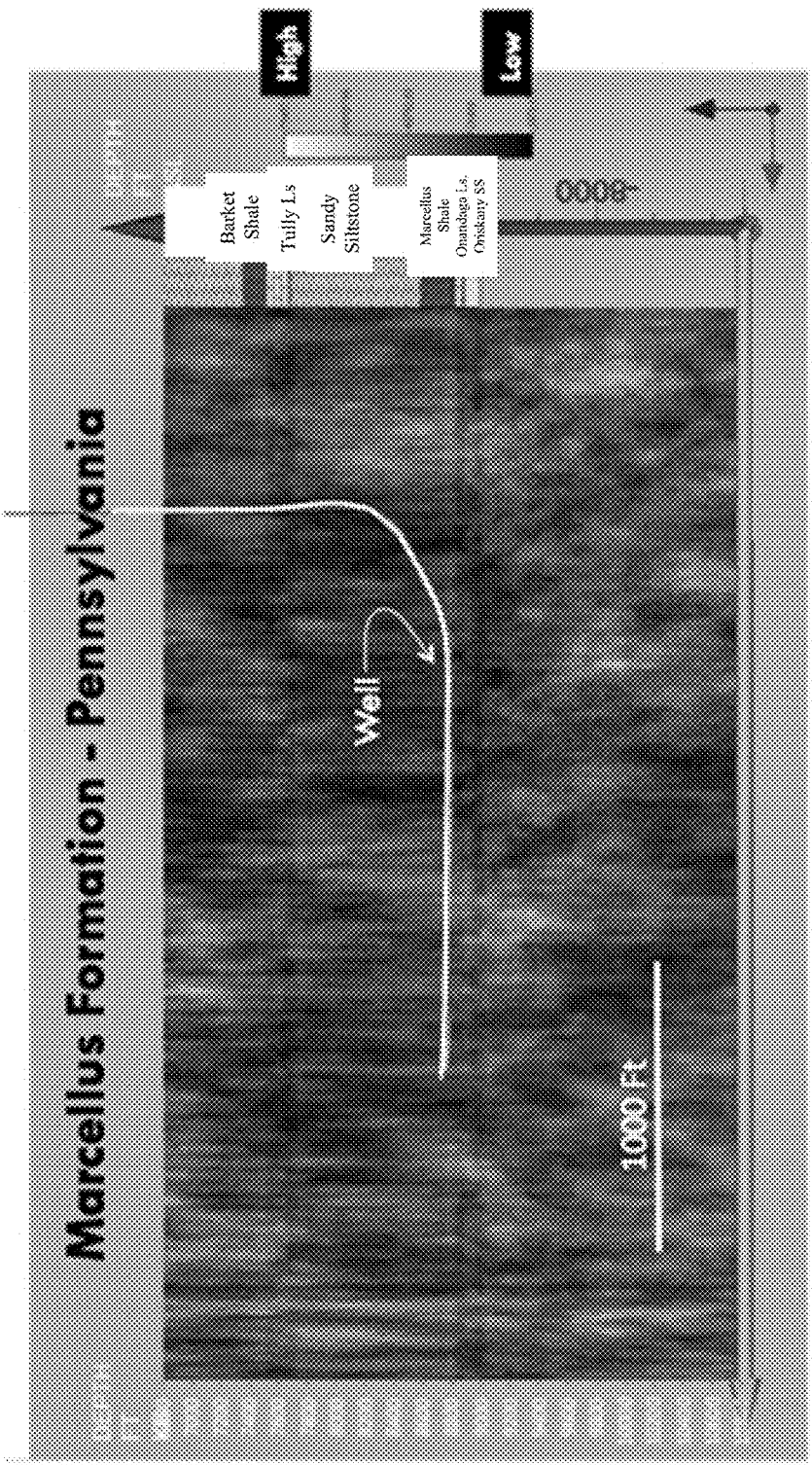
FIG. 9: Slice through a Full Activity Volume (FAV) showing lithologic dependence of HAC, where relatively high semblance occur primarily in stronger units, while more ductile units (horizontal thin dark bands) show little to no semblance. Contrast in semblance values corresponds to relative rock strengths. (courtesy Ambient Reservoir Monitoring Inc.)

The set of darker (lower semblance value) bands shown in FIG. 9 correlate with a set of more ductile units shown in the well log shown in the figure, while the more active regions having lighter values expressed as vertical bands which largely terminate against the more ductile units. Thus, the layered variation in semblance is a mechanical stratigraphy i.e. the interlayering of darker horizontal bands and lighter, thicker horizontal bands, reflects variation in the mechanical strength and fluid content of the layers. The vertical light-colored zones are slices through HACs. The absence of stratigraphic offset is consistent with their interpretation as fracture zones rather than faults. This is consistent with the GeoCritical paradigm (Malin and Leary, 2020) while there may be some faults, HAC and AFI are primarily fracture zones with little or no faulting.

Figure 10:
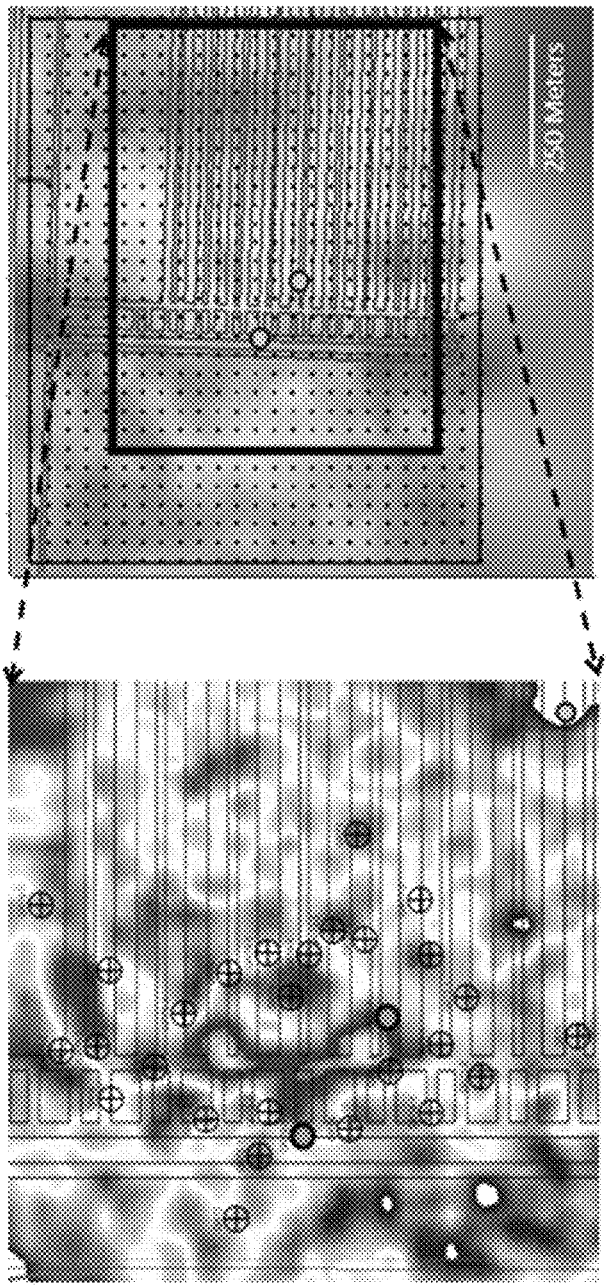
FIG. 10: Comparison of 4D Seismic and semblance data from a mine inflow site showing a direct correspondence between the region of high semblance value and location of fluids indicated by 4 D seismic. The data are superposed on the mine workings.

Fluid Pathways and Semblance Iso-Surfaces: The Relation of Semblance to the Fluid Content and Permeability of Rock Fundamental to an understanding of the GeoCritical reservoir permeability field is the recognition that the semblance value generated by FSI has a proportional relation to the fluid content of the rock and, as all fractures that remain open at reservoir depths must contain fluid, to fracture density. This is shown by FIG. 10. The 4D seismic maps the location of fluid. The semblance data was procured about 9 months after the initial inflow had been reduced by about 90%. The figure shows a virtual 1:1 correspondence between the location of fluid indicated by the 4D seismic and the semblance map. Further, there is a proportionality between the semblance value and fluid content where the higher the fluid content the higher the semblance value.

FIG. 11 is another example of the relationship between semblance and fluid content. The map shows the location of Reservoir Scale AFI (black lines) and similar to FIG. 10 indicates a proportional relationship between semblance value and fluid content. The fluid content of the rock is shown by the green, yellow and red semblance with the red indicting the highest content.

The BEFORE is a map slice through a Full Activity Volume (FAV) semblance clouds and AFI (the black lines).

The DURING image is a vertical slice through the FAV during the frac showing the location of fluids injected during fracking.

The AFTER image is a projection of the 3D volume of the region shown by the BEFORE and DURING images.

The AFTER image is situated above the BEFORE map to show that the location of the fluids activated by production have a 1:1 correspondence between the BEFORE and AFTER locations such that the maximum fluid production is where the well intersected the AFI. Note the vertical orientation of the maximum length and the very high aspect ratio of the roughly ellipsoidal HAC of the "AFTER" volumes shown in FIG. 11. Their geometry and orientation are the same as the white vertical HAC shown in FIG. 9. All HAC at reservoir depths have these geometric and spatial characteristics, like most fluid filled fractures the principal axis of the HAC ellipsoids is parallel to Si which as Fisher and Warpinski (2012) show is vertical at these depths.

Relationship Between Voxels and Permeability

The fundamental imaging unit of FSI is the three-dimensional pixel or voxel. Both fracture density and fluid content have a proportional relationship to the semblance value, i.e. the higher the fluid content, the higher the semblance value. Both parameters relate to permeability.

Figure 12:
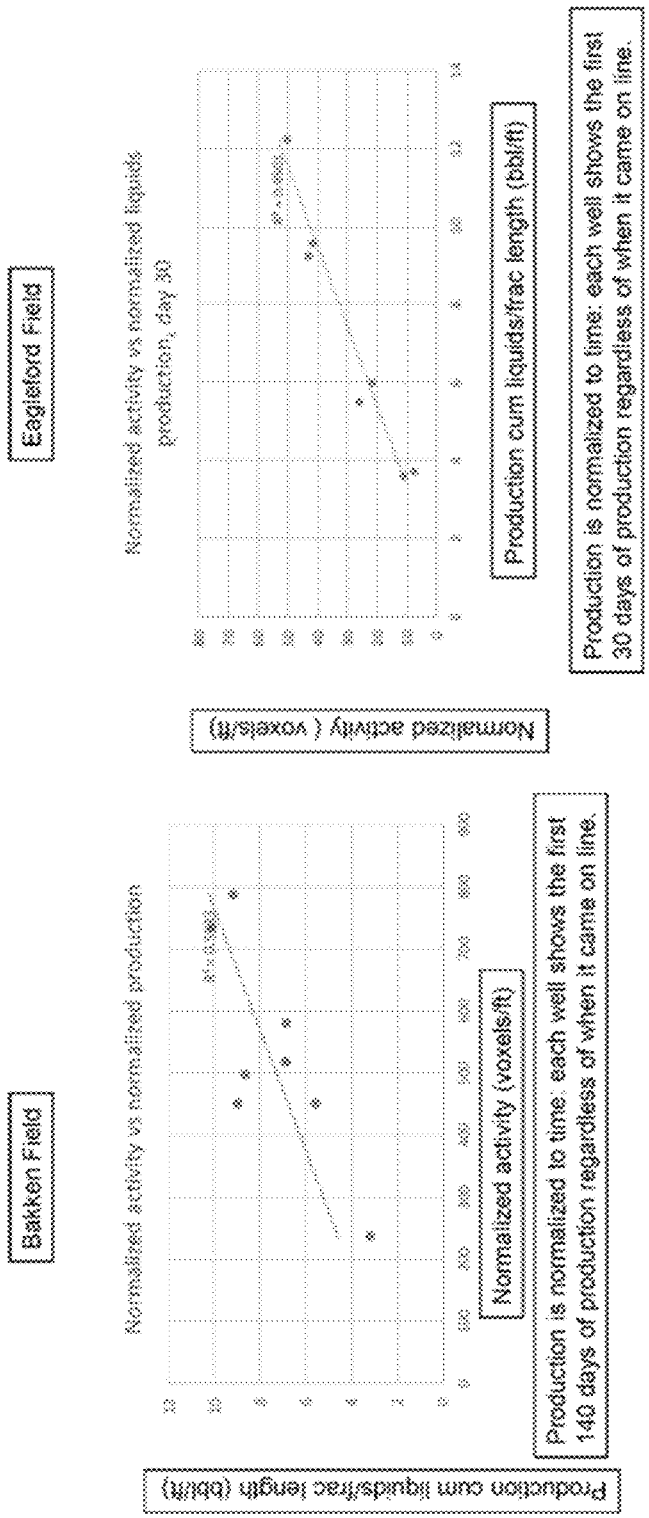
FIG. 12: Production v. high relative semblance voxels/foot of well length.
Figure 13:
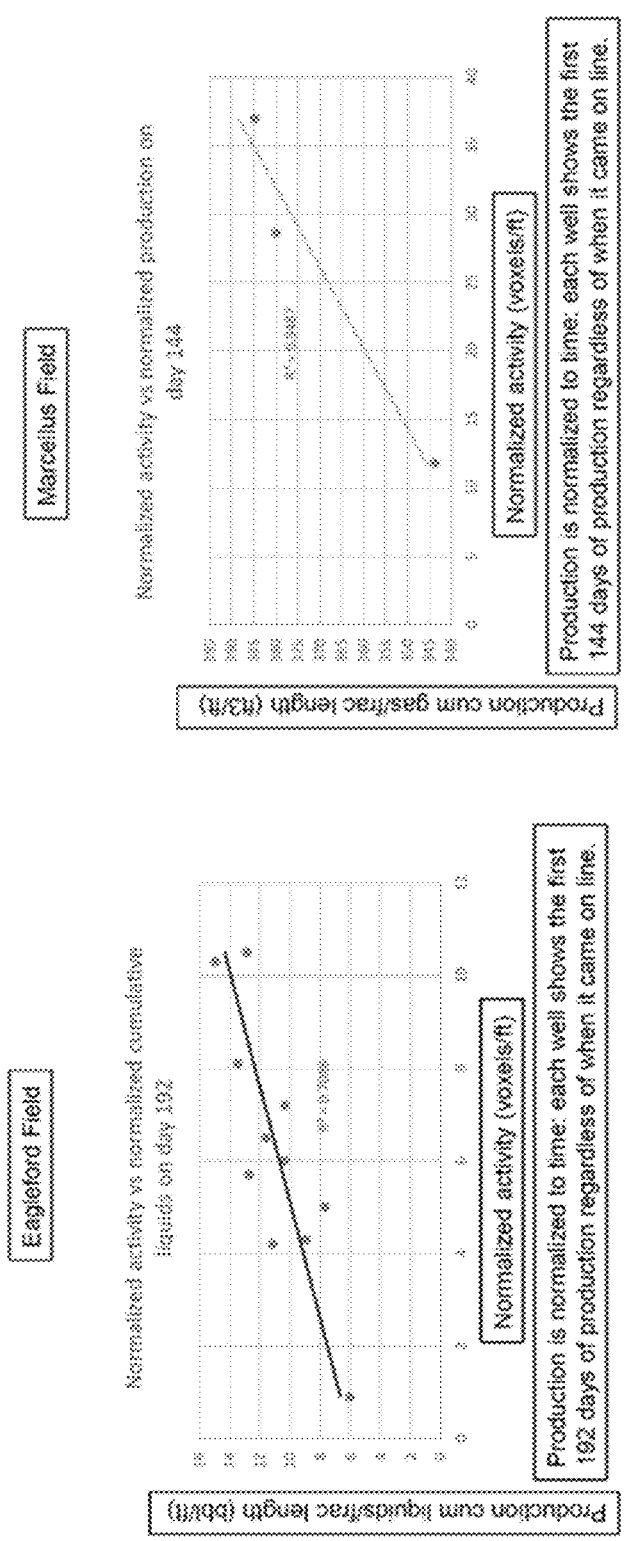
FIG. 13: Production v. high relative semblance voxels/foot of well length.

Evidence for this is given by FIGS. 12 and 13, showing the relationship between the number of Near Well Active (NWA) voxels and production. Production requires permeability. The data show that the number of NWA voxels is directly proportional to the production, i.e. the greater the number of NWA voxels/foot of well length, the greater the production. The work flow for finding the NWA voxels selects for a set of voxels that are connected to the well and have relatively high semblance. Although not an independent parameter as it is a function of crack density and fluid volume, it is reasonable to conclude from the forgoing that permeability is a parameter reflected by the voxel SS value.

Near Well Active Voxels (NWA) are those voxels whose semblance value is either 1 or 2 standard deviations from the Mean of all voxels in the FAV and that are either directly attached to the well or attached to a voxel that is directly attached to the well (see Wellbore Activity (Near Well) Analysis and Method).

These data show a strong linear correlation between the number of NWA voxels/length (e.g., foot) of well and production/unit time. Production/unit time is a direct measure of permeability. A "Pipe" analog model for this relationship is the following:

Consider each NWA voxel as a "pipe" carrying fluid to the well. If all the pipes are the same diameter and carry the same amount of fluid, i.e. have the same permeability, then the relationship between the number of pipes connected to the well and production is linear. As shown, the semblance value has some unknown functional proportionality to the amount of fluid within each voxel which in turn is directly related to the fracture density. Therefore, in order to have the same permeability all the NWA must have the same semblance value, which they do not. However due to the process by which the NWA voxels are selected (for details see Wellbore Activity (Near Well) Analysis and Method), for any given well the total NWA voxels for that well, in aggregate, have the same average permeability i.e. effectively the same permeability as required by the "pipe" analog model. This occurs because the selection process for the NWA voxels has 3 requirements which tightly limit their range of semblance values. The NWA selection process is as follows.

All the voxels of the FAV are sampled, however only voxels whose semblance values are within 1 or 2 standard deviations greater than the mean are selected as NWA voxels. This is a subset of the set of all voxels in the FAV and consists only of voxels with the highest semblance values.

Of this subset, only those in the same lithologic horizon, the producing horizon, are selected, reducing the total number of voxels further, i.e. it's a subset of a subset.

Every lithologic unit has approximately the same physical properties throughout its extent, thus the semblance values of the NWA voxels will be similar.

Full Activity Volumes, Semblance Clouds and AFI: Direct Mapping of the GeoCritical Reservoir Permeability Field The foregoing material shows: (i) There is a proportional correspondence between voxel semblance value, fluid content and fracture density; and (ii) The linear relationship between voxels/foot of well and production/unit time indicates that voxel semblance value bears an unknown but proportional functional relationship to permeability, i.e. the higher the semblance value the higher the permeability.

Figure 14:
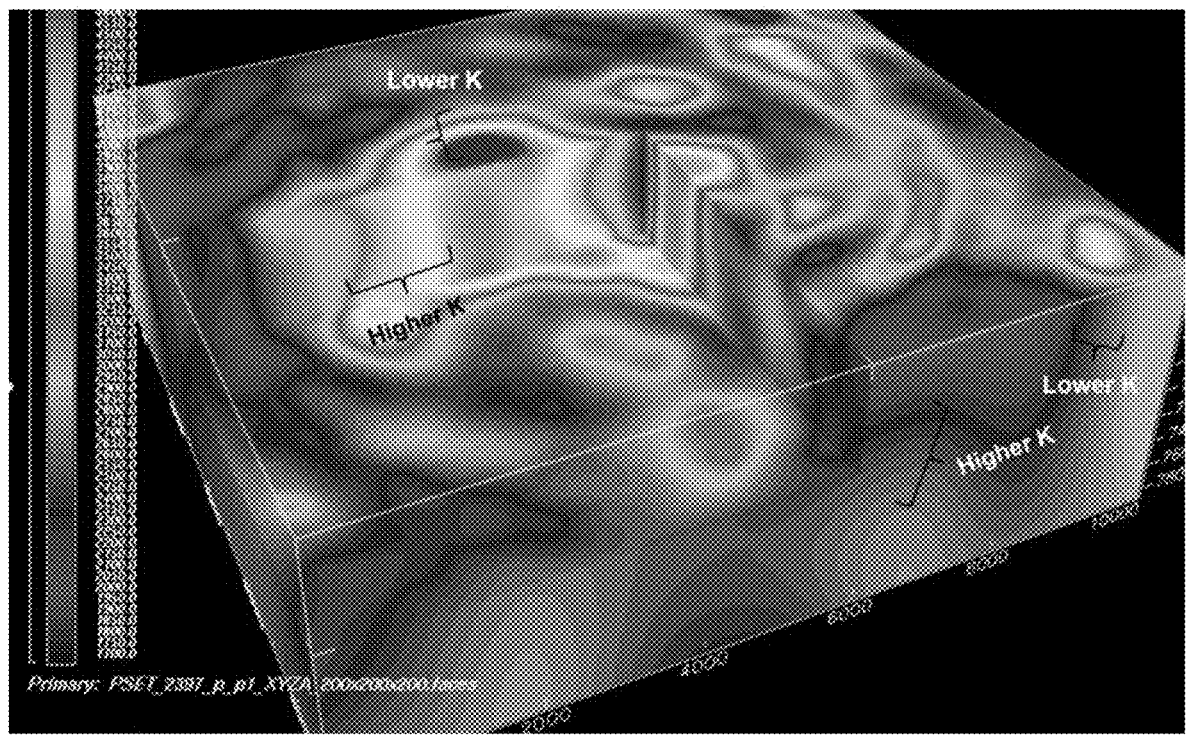
FIG. 14: Chair cut of a Barnett full activity volume showing "Country Rock" semblance "clouds" and proposed interpretation of semblance value gradients where lower gradients represent volumes of higher K and higher semblance gradients lower K. The hotter a volume color, the higher fluid content, fracture density and permeability.

FIG. 14 is a Full Activity Volume (FAV) of part of the Barnett showing the ambient semblance field. A striking aspect is the systematic variation in width of the semblance "clouds" and gradation in semblance value showing a reduction away from regions of maximum semblance value. The systematics in semblance value is a 3D mapping of the permeability field for the following reasons.

The semblance value is proportional to fluid content, the higher the semblance value the relatively greater the fluid content.

At typical reservoir depths all open fractures contain fluids therefore the semblance value is also a function of fracture density.

FIG. 12 and FIG. 13 show a linear relationship between the number of NWA voxels/foot and production/unit time. This is interpreted to mean that the voxel semblance value is also proportional to permeability.

While any given FAV is a snap shot in time, it represents the same amount of geologic time. Thus the lower the semblance value gradient, the further that fluids have migrated and therefore the higher the bulk permeability K, i.e. the crack density indicated by the semblance value drops off slowly, while the steeper the semblance value gradient, the more rapidly the fracture density drops off and the lower the bulk permeability K. Accordingly it is reasonable to conclude that the combination of AFI and semblance "clouds" is an actual map of the permeability field in its strict mathematical and physical sense.

Semblance values from iso-surfaces, where the iso-surface semblance values systemically decrease outward from volumes of maximum semblance value. Principal drivers of the semblance value are rock strength, fracture density and its control of fluid content. At the relevant depths of the FSI data, all fractures are fluid filled, therefore fracture density and fluid content have a 1:1 correspondence. Thus, variation in FAV iso-surface semblance value reflects the systematics of both fracture density and fluid content. Decrease in semblance value outward from regions of high semblance reflects the variation in permeability and, therefore, the AFI backbones and AFF mapped by FSI represent the permeability field of the Earth's brittle crust.

Wellbore Activity (Near-Well) Analysis and Method

Figure 15:
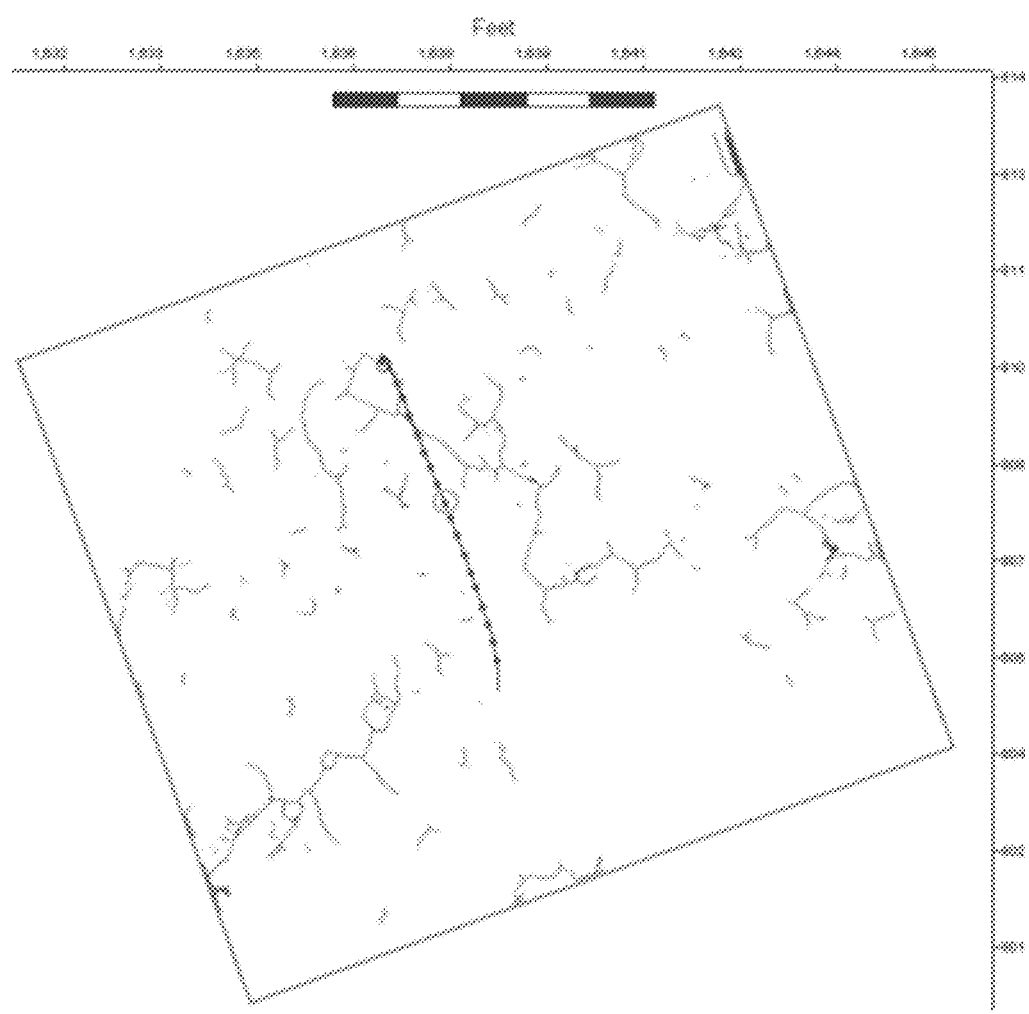
FIG. 15: Map of ambient AFI (orange lines) with treatment well and frac stage location showing failure to image induced fractures.

The original fracture network analysis for frac projects often displayed very little or no activity at the perf location being pumped. These analyses were carried out on stacked activity volumes computed for the total time interval of the frac stage being analyzed. The activity over the time interval was dominated by the high-amplitude activity on the study volume's pre-existing fracture network, obscuring activity at the lower amplitude frac-perf locations. FIG. 15 shows an example of the lack of activity at the stage location being pumped (green circle) over the total time interval of the stage. In order to isolate the activity at the stage-perf location, the near-well analysis was developed. This analysis is generally referred to as the Wellbore Activity analysis.

The Wellbore Activity analysis is based on the assumption that activity along the well takes place at discrete times and that due to differences in the energies, summing these times of activity with the non-active times results in obscuring the signal. Therefore, this analysis requires breaking down the time interval of interest into sub-time intervals. The analysis is carried out on the whole study volume. There is no initial spatial clamping of the volume. The total time interval of interest is selected. For a frac project, this is usually a single frac stage. For a well-production analysis, a time interval recorded during production is used. The analysis can be carried out on purely ambient time intervals in order to predict potential activity on an existing or planned wellbore.

The selected time interval is broken down into sub-time intervals. For example, an hour-long frac stage might be broken down into 60, 1-minute intervals. These sub-time intervals are called the input volumes. They are fully populated activity volumes, all voxels in the volume are populated with an amplitude.

Next, we select an amplitude that indicates enhanced activity, above the background amplitude. The original method was to manually view iso-surfaces within the volume and select an amplitude that defined independent (non-intersecting) high-amplitude "clouds" of voxels. This amplitude was used as a cut-off value. Voxels with amplitudes lower than the cut-off amplitude were removed from the volume and voxels at and above the cut-off value were retained. Empirical observations showed that this cut-off amplitude generally resulted in retention of about 5% of the voxels in the input volume. Using this observation and progressing to using a percentage of voxels in the volume to identify the cut-off amplitude allowed automation of the process, no longer requiring manual observation of all the sub-volumes. Some manual observations are still used to refine the exact percentage of voxels used.

We further developed the selection of "active" voxels by computing the mean amplitude value for each input volume and adding a number of standard deviations (STD) to that mean value. A workflow in Seispace is used to identify the number of input volumes that are consider active at a suite of different standard deviation values for a given section of a well. An example of this output is shown in TABLE 1. Results are shown for 4 stages. The stage locations are queried to determine if there is activity in voxels on the wellbore for amplitudes of the mean+X STD. For example, Stage 1 has a total of 166 input volumes. Selecting an amplitude value≥Mean+1 SD gives us 85 output volumes containing voxels that are in direct contact with the well. For amplitude values≥Mean+2 STD, only 25 volumes contain voxels that are in direct contact with the well. For multi-stage projects, all stages are considered in selecting the cut-off amplitudes. Because the analysis is carried out for each individual input volume, the numerical value of the cut-off for each volume will differ. This is one method for selecting the cut-off amplitudes for the Wellbore Activity analysis. Accordingly, any of the methods provided herein may further utilize the step of determining the number of SD different from the Mean, thereby impacting the total number of NWA voxels.

Once the number of STD to be added to the mean amplitude value is determined, every input volume within the time interval is clamped to those values. Again, all voxels in the volume that have amplitudes lower than the cut-off amplitudes are removed from the volume. Each input volume is then queried in order to determine if any of the remaining (high-amplitude) voxels are in direct contact with the wellbore. If there are wellbore connected voxels, the input volume is retained, if not, it is removed from the time-interval data set.

Figure 16:
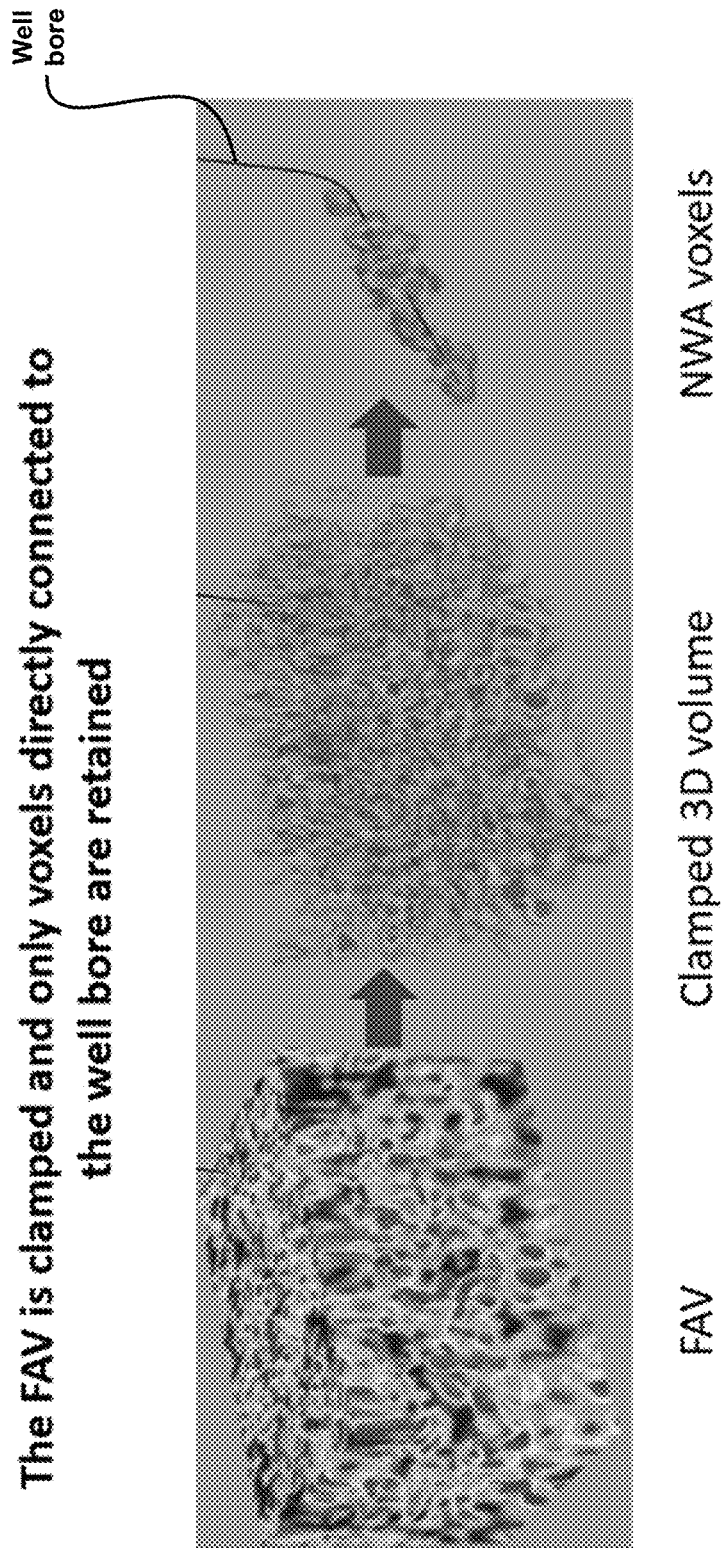
FIG. 16: NWA voxels identified by an instant method to inform well location in a fluid reservoir.

For each retained input volume all voxels directly connected to the wellbore and all additional voxels that are indirectly connected to the wellbore (voxels adjacent to the wellbore voxels that have amplitudes at or above the cut-off amplitude and voxels adjacent to those active voxels) are retained and the remaining voxels are removed from the input volume. FIG. 16 shows a fully populated input volume, the same volume clamped to the mean+STD cut-off, and last, only the voxels within that volume that are directly and indirectly connected to the wellbore. This example shows a complete wellbore analysis (as might be used in a production volume) not a single stage of a frac project.

After this clamping is carried out on all input volumes that are remaining in the time interval of interest, all input volumes are concatenated to generate the final Wellbore Activity Volume (WAV).

The Linear Well Production Forecasting (LWPF) Method

The following is an outline of the LPF method:

Acquire a Full Activity Volume (FAV) for the Reservoir of interest. The FAV can be acquired by either "piggy-backing" on a 3D seismic survey, a geophone surface array, a geophone buried array or some combination of the foregoing.

Apply FSI to the data collected to obtain a FAV.

Find the Threshold Semblance Value (TSV). The TSV is used to identify the Near-Well activity (NWA) voxels. To find the TSV calculate the mean semblance value of all the voxels in the FAV and determine the 1st and 2nd standard deviations greater than the mean. These are the TSV.

Use the TSV to identify the set of potential NWA voxels. Populate the 3D volume with the NWA voxels by clamping out all voxels whose semblance values are less than those of the NWA voxels.

Identify those locations for optimal production by the following method: Using "virtual" wells find those locations in the target horizon which have the maximum number of NWA voxels which are in Direct Contact with the virtual well (NWA DC). Where the maximum number of NWA DC includes all those NWA voxels which are either directly connected to NWA DC voxels or those which are in direct contact with a NWA DC.

REFERENCES

Angus, D. A. and Verdon, J. P., 2012; Using micro-seismicity to estimate formation permeability for geological storage of CO2, Research Article available from Academia.

Brown, A. R., 1991, Interpretation of 3 Dimensional Seismic Data, 3rd Edition, AAPG Memoir 42, 342 pp.

Elliott, D., 1977, Some aspects of the geometry and mechanics of thrust belts, 8th Annual C.S.P.G. Seminar, Part 1, Department of Geology, University of Calgary.

Fisher, K. and Warpinski, N., 2012, Hydraulic-Fracture-Height Growth: Real Data; SPE 145949, SPE Production & Operations, February, pp. 8-19.

Geiser, P. A., Vermilye, J., Scammell, R., Roecker, S., 2006. Seismic used to directly map reservoir permeability fields. Oil & Gas Journal, December 11, Dec. 18, 2006.

Geiser, P., Lacazette, A. and Vermilye, J., 2012. Beyond "dots in a box", First Break, 30, 63-69.

Janssen, C., Wagner, F. C., Zang, A. and Dresen, G. [2001] Fracture Process zone in granite: a microstructural analysis. Int. J. Earth Sciences (Geol. Rundschau); 90, 46-59.

Laubach, S., Marrett, R. and Olson, J., 2000, New Directions in Fracture Characterization, The Leading Edge, July, 704-711.

Malin, P. E., P. C. Leary, L. M. Cathles, and C. C. Barton, Observational and Critical State Physics Descriptions of Long-Range Flow Structures, 2020, Geosciences 2020, 10(2), 50; doi.org/10.3390/geosciences10020050.

Marrett, R., Ortega, O. J., Kelsey, C. M., 1999, Extent of power-law scaling for natural fractures in rock, Geology; September 1999; v. 27; no. 9; p. 799-802.

Michelena, J., Gilman, J. R., Zahm, C. K., 2019, Seismic, geologic, geomechanics, and dynamic constraints in flow models of unconventional fractured reservoirs: Example from a south Texas field, 2019, the Leading Edge, February, 116-122

North, F. K., 1985, Petroleum Geology, Allen & Unwin, 607 pp.

Paterson, M. S. and Weiss, L., 1961, Symmetry concepts in the structural analysis of deformed rocks, Geol. Soc. America Bull., 72, p. 854.

Scholz, 2002 Scholz, C. H., 2002, The Mechanics of Earthquake Faulting, 2nd Edition, Cambridge University Press, 471 pp.

Shapiro, S. A., 2008, Microseismicity: A tool for Reservoir Characterization, Education Tour Series CIS, EAGE publications, 67 pp.

Sicking, C. J., and P. E. Malin, 2019, Fracture Seismic: Mapping Subsurface Connectivity, Geosciences 2019, 9(12), 508; doi.org/10.3390/geosciences9120508.

Tary, J. B., M. Van der Baan, B. Sutherland, and D. W. Eaton (2014a), Characteristics of fluid induced resonances observed during microseismic monitoring, Journal of Geophysical Research, 119, 8207-8222.

Tary, J B, M. Van der Baan, D W. Eaton, (2014b), Interpretation of resonance frequencies recorded during hydraulic fracturing treatments Journal of Geophysical Research: Solid Earth 119 (2), 1295-1315

Van der Pluijm, B. A. and Marshak, S., 2004, Earth Structure, 2nd Edition, W. W. Norton & Company, 656 pp.

Vermilye, J. M. and Scholz, C. H., 1998, The process zone: A microstructural view of fault growth. J. Geophys. Res—Solid Earth 103, 2223-12237.

Zoback, M. D., 2011, Reservoir Geomechanics, Cambridge University presemblance, 5th Edition, 449 pp.

Time Dependency of Voxel Semblance Value

The semblance value of any given voxel varies with time. This variation is due to rock resonance generated by stress waves that have strain rates on the order of $10^{-4}$/second. Such strain rates are typical of teleseismic waves created by earthquakes. There are probably other sources for such relatively high strain rate stress waves. Note that the crust is very weak such that deviatoric stress as small as $10^{-2}$ bars are capable of causing failure on pre-existing fractures.

The methods provided herein predict the optimal well location prior to drilling. This means that a prediction is made using ambient (pre-frac) data rather than frac data. The methods are based on frac data indicating a linear relationship between NWA voxels and production. This is not a concern for the following reasons:
  (i) Empirical data indicates that the semblance value is largely a function of fracture density
  (ii) Fracture density relates directly to fluid content because at reservoir depths all fractures have to be fluid filled in order to remain open.
  (iii) Therefore, while the semblance value of any voxel may vary with time, because the fracture density changes relatively slowly if at all, the relative semblance values of the voxels should remain approximately the same.

Because of this time variability of the semblance value, semblance values may be taken for multiple time volumes. This works in the following manner:

All imaging of the permeability field is for some period of time, usually on the order of hours. Typical sample rates are 500 Hz; therefore, it is possible to create Full Activity time Volumes ranging from <1 second to that of the total time of the survey, e.g. hours or days. We have found that the energy emitted by crustal rock contains frequencies ranging from about 2 HZ to 0.001 Hz. This suggests a way to devise a sampling scheme by using the rock energy frequency spectrum as a template for selecting FAV intervals, e.g. for the 2 Hz signal a sample interval of a multiple of 2 seconds, for the 0.001 Hz, a multiple of 1000 seconds, etc.

Using this or an arbitrary time interval, e.g. 1 second, 5 minute, etc., select a set of FAV for the desired time interval and run the following method. It is desired to find locations with the maximum number of NWA voxels—see, e.g., the section above titled "WELLBORE ACTIVITY (NEAR-WELL) ANALYSIS AND METHOD". There may be permanent monitoring with FSI of the FAV, including monitoring over the course of years, with any arbitrary time interval thereof.

We have established that not only can FSI map the permeability field in time and space. In addition, there is a proportional relationship between voxel semblance value, fluid content and fracture density; the higher the semblance value, the higher the permeability. In this manner, a method for locating a well-bore so as to optimize or maximize fluid recovery is provided herein.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Every device, system, combination of components, or method described or exemplified herein can be used to practice the invention, unless otherwise stated.

Whenever a range is given in the specification, for example, a physical dimension or a time range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of excludes any element, step, or ingredient not specified in the claim element. As used herein," consisting essentially of does not exclude materials or steps that do not materially affect the basic and novel characteristics of the claim. In each instance herein, any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that devices, systems, and methods other than those specifically exemplified can be employed in the practice of the invention without resort to undue experimentation. All art-known functional equivalents, of any such devices and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

TABLE 1

|  | Stage 1 | Stage 2 | Stage 3 | Stage 4 |
| --- | --- | --- | --- | --- |
| FFID Range | 2101923-2102203 | 2111259-2111539 | 2111637-2111837 | 2111927-2112127 |
| Number of Input volumes | 166 | 167 | 126 | 123 |
| Mean + 1.00 STD Output volumes | 85 | 88 | 69 | 59 |
| Mean + 1.10 STD Output volumes | 83 | 81 | 63 | 52 |
| Mean + 1.20 STD Output volumes | 76 | 72 | 57 | 47 |
| Mean + 1.30 STD Output volumes | 72 | 60 | 48 | 45 |
| Mean + 1.40 STD Output volumes | 63 | 54 | 47 | 38 |
| Mean + 1.50 STD Output volumes | 54 | 44 | 41 | 33 |
| Mean + 1.60 STD Output volumes | 48 | 39 | 33 | 25 |
| Mean + 1.70 STD Output volumes | 43 | 30 | 29 | 21 |
| Mean + 1.80 STD Output volumes | 38 | 25 | 21 | 15 |
| Mean + 1.90 STD Output volumes | 32 | 18 | 19 | 14 |
| Mean + 2.00 STD Output volumes | 25 | 16 | 16 | 11 |

We claim:

1. A method for locating a well bore for fluid recovery, the method comprising the steps of:
    acquiring a full activity volume (FAV) for a reservoir of interest from seismic energy generated by a country rock within the reservoir of interest, wherein the FAV comprises a plurality of voxels;
    calculating a characteristic semblance value for all the voxels and a user-selected semblance statistical value of the characteristic semblance value over all the voxels, thereby obtaining a measure of a permeability field for the reservoir of interest;
    determining a threshold semblance value (TSV) by identifying all voxels having a semblance value that is greater than or equal to the user-selected semblance statistical value above the characteristic semblance value, thereby mapping the permeability field;
    identifying near well activity (NWA) voxels corresponding to the TSV voxels identified in the mapped permeability field;
    wherein the NWA voxels correspond to a putative well bore location, thereby locating the well for fluid recovery from the mapped permeability field; and
    wherein the semblance value is a time-varying semblance value.

2. The method of claim 1, further comprising the step of determining a maximum number of NWA voxels in direct and/or indirect contact with the putative well bore location.

3. The method of claim 2, wherein the maximum number of NWA voxels further comprises voxels directly adjacent to the voxels in direct contact with the putative well location or that is connected indirectly to the putative well location via an one or more intervening voxel.

4. The method of claim 2, further comprising the steps of:
    determining the maximum number of NWA voxels for a plurality of putative well bore locations; and
    identifying an optimal well bore location corresponding to the putative well bore location having a highest maximum number of NWA voxels.

5. The method of claim 1, wherein the fluid is a liquid and the liquid recovery of the well bore positioned at the putative well bore location is proportional to a total number of NWA voxels.

6. The method of claim 1, wherein the acquiring the FAV step comprises using one or more of:
    a 3D seismic survey;
    a geophone surface array;
    a geophone buried array; or
    any combination thereof;
    for a reservoir of interest.

7. The method of claim 1, wherein the user-selected semblance statistical value is one standard deviation or greater.

8. The method of claim 1, wherein the determining the TSV step is by identifying all voxels having the semblance value that are greater than two standard deviations of the characteristic semblance value, wherein the characteristic semblance value is a mean semblance value.

9. The method of claim 1, wherein the fluid recovery is for recovery of hydrocarbon or water.

10. The method of claim 1, wherein each voxel has a volume of between 5 m$^3$ and 12 m$^3$.

11. The method of claim 1, wherein the reservoir of interest has a volume of between 1 km$^3$ and 1000 km$^3$.

12. The method of claim 1, further comprising the step of populating a 3D volume representation of the reservoir of interest with the NWA voxels and not populating the 3D volume with voxels having a semblance value less than the semblance value of the NWA voxels, thereby visualizing the NWA voxels.

13. The method of claim 1, further comprising the step of drilling a well bore in the reservoir of interest at a location corresponding to the putative well bore location having the highest maximum number of NWA voxels.

14. The method of claim 1, wherein the semblance value is determined for multiple time periods.

15. The method of claim 1, wherein the step of acquiring the FAV comprises: imaging the reservoir of interest for a period of time, the period of time ranging up to 24 hours and at a sampling rate of between 100 Hz and 2 KHz.

16. The method of claim 1, wherein the FAV is obtained for a time range that is between 0.5 s and 100 days.

* * * * *